May 12, 1953          J. N. VICTOR          2,638,164

CONTROL MECHANISM

Filed June 16, 1950          5 Sheets-Sheet 1

INVENTOR.
Joseph N. Victor
BY
Leonard L. Kalish
ATTORNEY

May 12, 1953   J. N. VICTOR   2,638,164
CONTROL MECHANISM

Filed June 16, 1950   5 Sheets-Sheet 2

INVENTOR.
Joseph N. Victor
BY
Leonard L. Kalish
ATTORNEY

May 12, 1953  J. N. VICTOR  2,638,164
CONTROL MECHANISM
Filed June 16, 1950  5 Sheets-Sheet 4
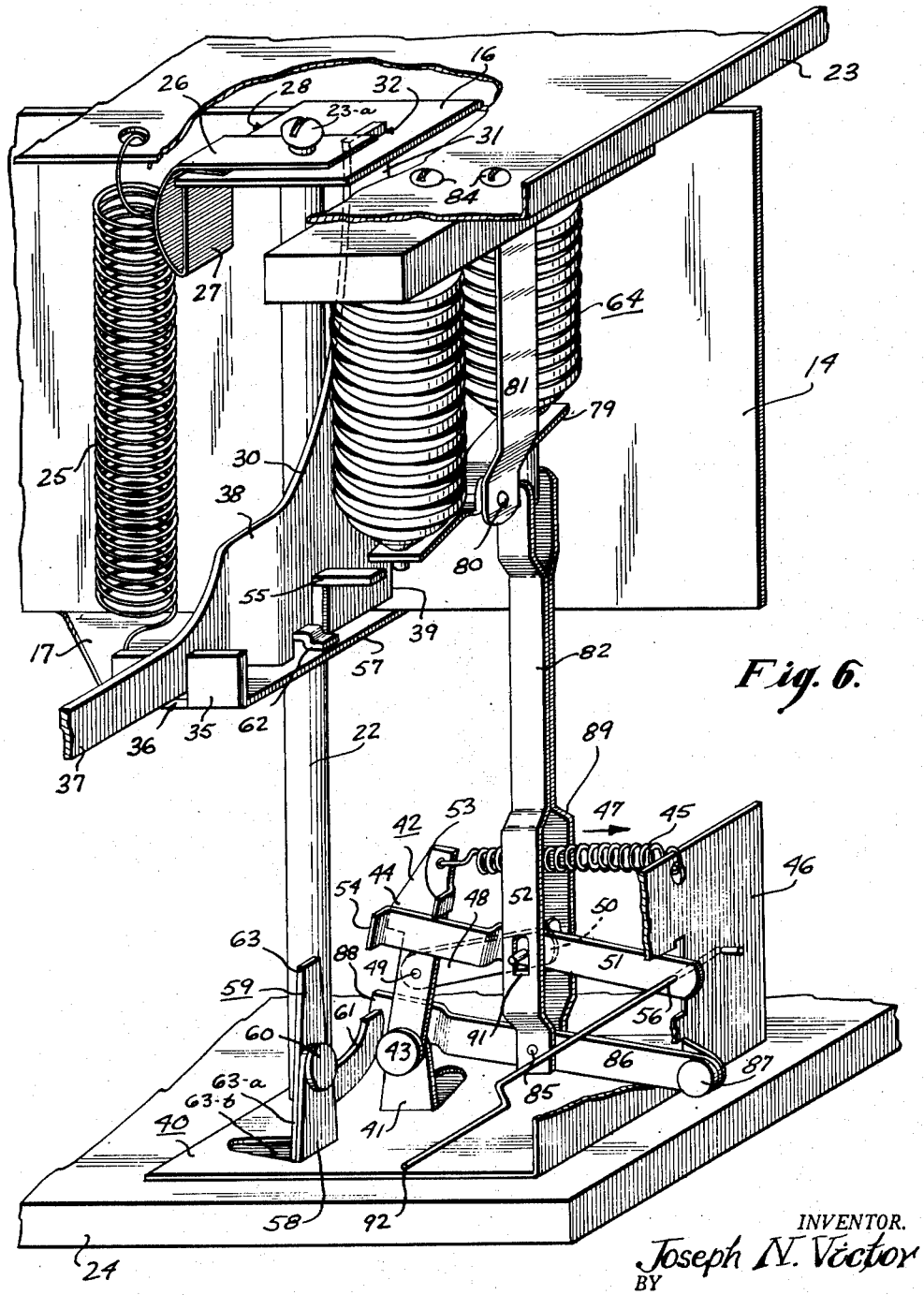
Fig. 6.
INVENTOR.
Joseph N. Victor
BY
ATTORNEY

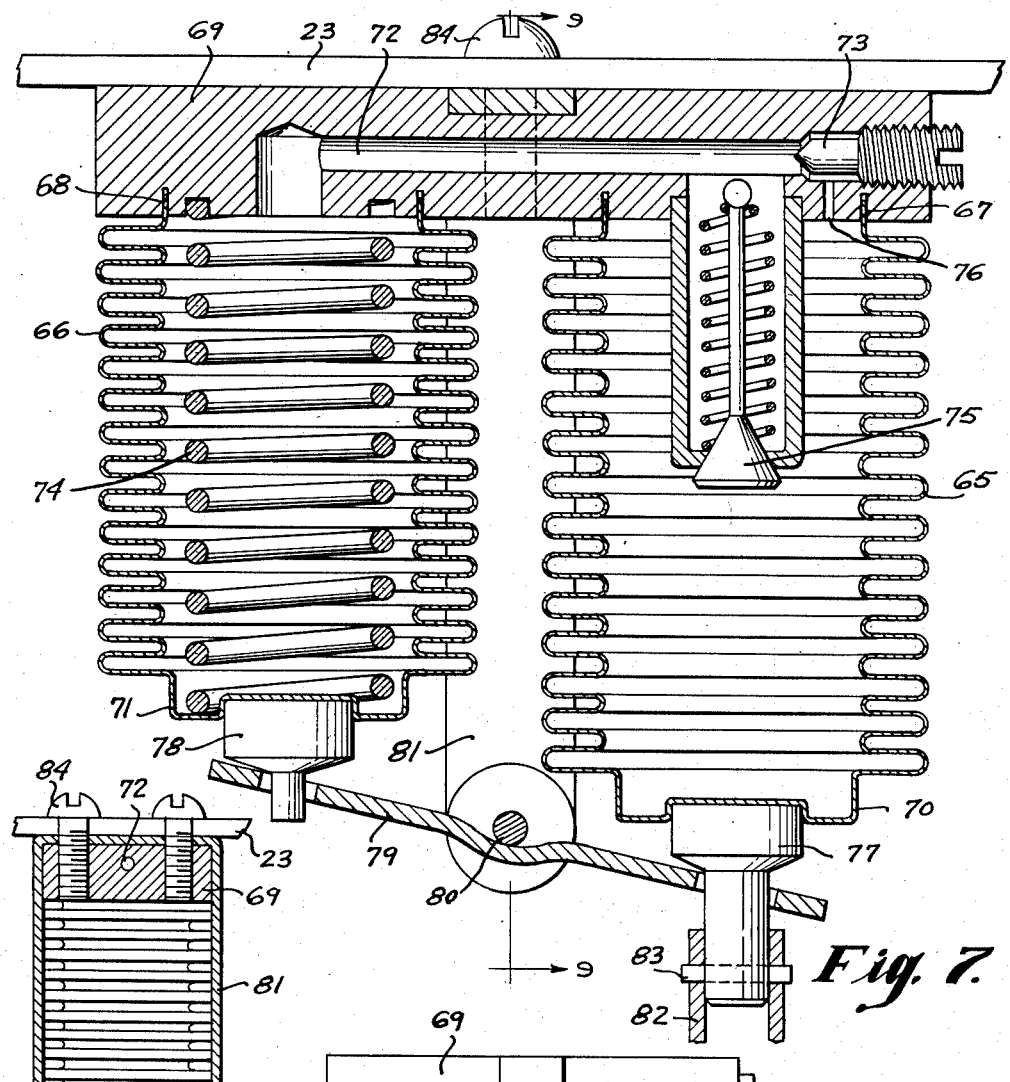
Fig. 7.
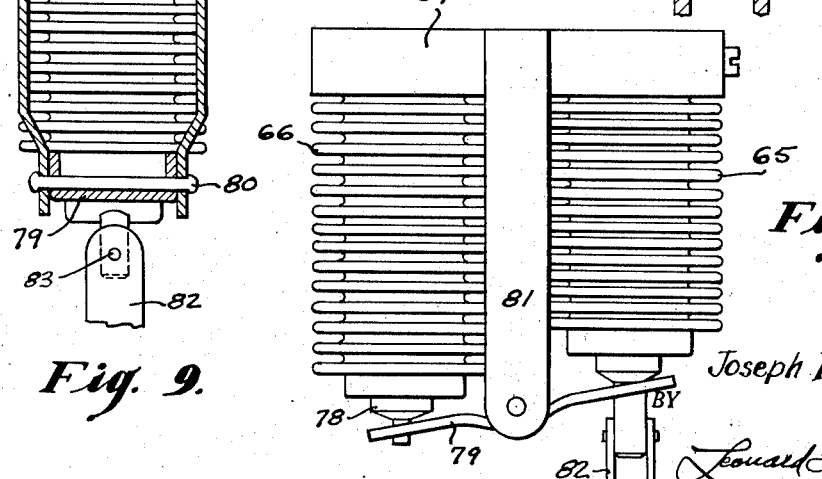
Fig. 9.
Fig. 8.
INVENTOR.
Joseph N. Victor
BY
Leonard L. Kalish
ATTORNEY Patented May 12, 1953

2,638,164

UNITED STATES PATENT OFFICE 2,638,164

CONTROL MECHANISM

Joseph N. Victor, Bethlehem, Pa.

Application June 16, 1950, Serial No. 168,607

6 Claims. (Cl. 161—1)

The present invention relates to automatic timing devices, and particularly to automatic timing devices employed in electric toasters or the like.

An object of the present invention is to provide an automatic timing mechanism adapted to operate control means at the end of a pre-determined time-cycle.

A further object of the present invention is to provide a new and novel latch, locking and trip means for use in conjunction with the automatic timing mechanism in an electric toaster whereby the bread-carrying portion of the toaster may be locked in toasting position and subsequently released at the end of a pre-determined time-cycle.

Another object is to provide a hydraulic timer adapted to control the variable operating period of a bread-toaster or the like.

Further objects will be apparent by reference to the appended specification, claims and drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the accompanying drawings wherein like reference characters indicate like parts:

Figure 6 represents a perspective view of the control and timing mechanism at the end of the time-cycle.

Figure 7 represents an enlarged vertical cross-sectional view along line 7—7 of Figure 5.

Figure 8 represents a side elevational view of the hydraulic interval control at the end of the time-cycle.

Figure 9 represents a vertical cross-sectional view along line 9—9 of Figure 7.

Figure 1:
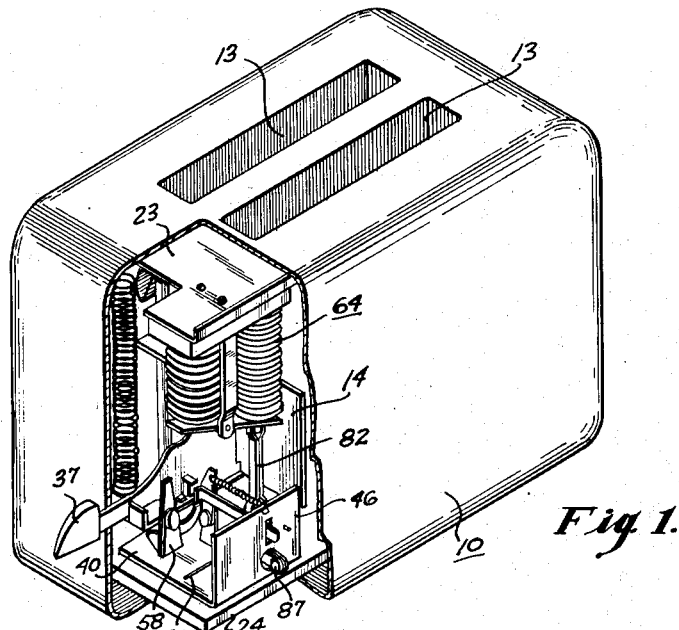
Figure 1 represents a perspective view of a toaster with a portion broken away to show the automatic control and timing means of the present invention.
Figure 2:
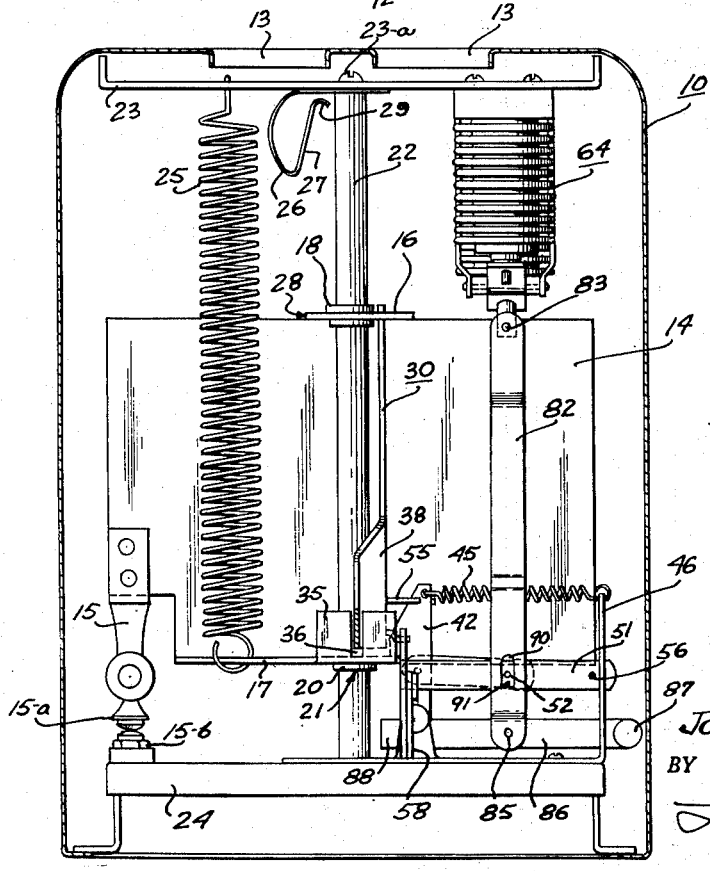
Figure 2 represents an end elevational view of the control and timing mechanism of the present invention.
Figure 3:
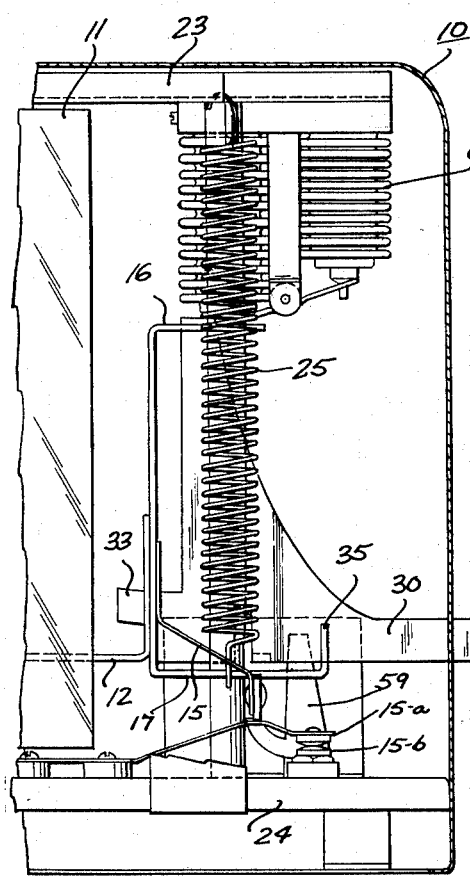
Figure 3 represents a side elevational view (from the left side) of the control and timing mechanism of the present invention.
Figure 4:
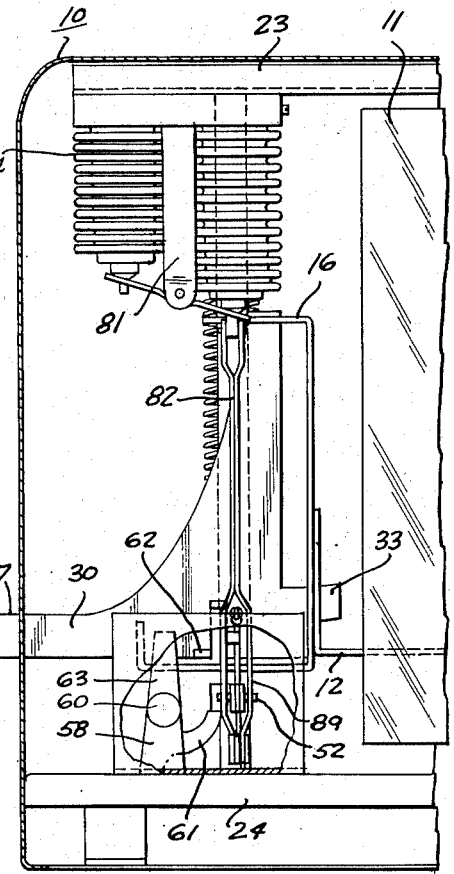
Figure 4 represents a side elevational view (from the right side) of the control and timing mechanism of the present invention.

The automatic control and timing mechanism of the present invention may be employed to regulate the time-cycle or operating cycle of many instruments. Thus, a variety of devices which have a moving element operated at the beginning of the time-cycle, to be locked in place and subsequently released at the end of the time-cycle, may employ the automatic control and timing device of the present invention.

An electric bread-toaster is illustrative of an instrument to which the automatic control and timing device of the present invention may be adapted. The movement of the bread-carrying tray into position at the beginning of the toasting period can be used to lock the trays in operative position and actuate the hydraulic interval control, and the interval control subsequently may release the bread-carrying trays to permit return to the non-toasting position, at the end of a predetermined time-cycle.

A toaster 10 may have heating elements 11 and bread-carrying trays 12. The trays 12 operate vertically in the bread-receiving slots 13.

The bread-carrying trays 12 may be secured at one end to the vertically movable carrier plate 14 and may have the opposite ends suitably guided so that when the bread to be toasted is placed on the trays 12, lowering of the carrier plate 14 will cause the trays 12 and the bread thereon to rest between the heating elements 11, all as is well known in the art.

Suitable means such as the insulated arm 15 may be secured to the plate 14 to close the contacts 15–a and 15–b of an electric circuit when the trays 12 are in lowered position, whereby to energize the heating elements 11.

The plate 14 has a pair of outwardly projecting guide arms 16 and 17 extending horizontally from the top and bottom, respectively, thereof. An anti-friction bushing 18 is disposed in a hole 19 in the upper arm 16, and an anti-friction bushing 20 is disposed in a hole 21 of the lower arm 17. The bushings 18 and 20 are adapted slidably to engage a guide-post 22 upon which the plate 14 may move vertically. The guide-post 22 is secured at its upper end to the top frame-member 23 of the toaster, as by the screw 23–a. In like manner, the lower end of the guide-post 22 is secured to the lower frame-member 24.

A tension spring 25 has one end secured to the lower arm 17 and its other end secured to the top frame-member 23 whereby to urge the plate 14 upwardly on the guide-post 22 toward the top frame-member 23.

A shock-absorbing silencer and stop-member 26 is secured at the upper end of the guide-post 22 beneath the top frame-member 23, and has an inclined portion 27 adapted slidingly to engage one edge 28 of the arm 16. Thus, as the tension spring 25 urges the plate 14 upwardly, the edge 28 of the arm 16 contacts the inclined portion of the shock-absorber 26 with gradually increasing friction whereby to bring the plate 14 to a stop and eliminate any jarring of the plate against the top frame member 23. A stop portion 29 on the shock-absorber 26 is adapted to overlie the top arm 16 whereby to limit the upward movement of the plate 14 in case the friction between the inclined portion 27 and the edge 28 of the arm 16 is not sufficient to bring the plate 14 to a complete stop.

An operating handle 30 is secured, at one end 31, in a slot 32 of the upper arm 16. A guide portion 33 passes freely through the slot 34 in the plate 14 and extends a slight distance therebeyond.

At the forward or outer end of the lower arm 17, a pair of up-turned ears 35 provide a slot 36 therebetween through which the forwardly and outwardly extending end 37 of the handle 30 may pass. An angular portion 38 of the handle 30 is adapted to limit the outwardly pivoting movement of the handle 30 by coming into contact with one ear 35, whereas the inner edge 39 of the handle 30 limits the inward movement of the handle 30 when it engages the outer surface of the plate 14.

Thus, the plate 14 and the bread-carrying trays 12 may be moved to the lower position by depressing the handle 30 at the outer end 37. This causes the handle 30 to pivot about the slot 32 and brings the edge 39 in contact with the plate 14. In this position, a positive engagement between the handle 30 and the plate 14 is secured and a continued push on the handle 30 will move the plate 14 downwardly along the guide-post 22.

As hereinbefore mentioned, when the downward thrust against the handle 30 is released, the tension spring 25 raises the plate 14 and the trays 12 to the inoperative or non-toasting position.

In order to retain the plate 14 and the trays 12 in the lowered position, the following locking means is provided.

A base-plate 40 may be secured to the lower frame-member 24 in any suitable manner. A tab 41 is formed from the base-plate 40 to support the locking arm 42 by the pivot pin 43.

The locking arm 42 has an ear 44 extending generally horizontally near its upper end, and also has a tension spring 45 operatively secured near the upper end thereof.

The tension spring 45 is secured, at its opposite end to a vertical portion 46 of the base-plate 40 and at all times urges the locking arm 42 in the direction of the arrow 47.

Between the pivot pin 43 and the ear 44 a link 48 is pivotally secured, at one end, as at 49, to the locking arm 42. The other end 50 of the link 48 is pivotally secured to a cocking-arm 51 by the pin 52 which extends laterally outwardly on both sides of the link 48 and the cocking-arm 51.

The inner end of the cocking-arm 51 lies adjacent the upper portion of the locking-arm 42 and is prevented from rising above the locking arm by the stop-member 53. The angular tab 54 at the inner end of the cocking-arm 51 is disposed vertically beneath a finger 55 on the handle 30. The opposite end of the cocking-arm 51 is pivotally secured by the adjuster 56 to the vertical portion 46 of the base-plate 40.

The plate 14 and the trays 12 are locked in the lowermost position as follows:

As the handle 30 is depressed, carrying the plate 14 and the trays 12 to the lower operating position, the finger 55 engages the tab 54 on the cocking-arm 51, pivoting the tab 54 downwardly about the adjuster 56. As the cocking-arm 51 moves downwardly under the action of the finger 55, the pivot-pin 52 is depressed and moved inwardly, causing the link 48 to pivot about the pin 49. This scissors-like action of the cocking-arm 51 and the link 48 causes the upper end of the locking-arm 42 to pivot inwardly about the pivot-pin 43, whereby the locking ear 44 will advance inwardly above the edge 57 of the arm 17 on the plate 14. The finger 55 moves the inner end 54 of the cocking-arm 51 downwardly far enough to align the cocking-arm 51 and the link 48. In this position, the edge 57 on the arm 17 is beneath the locking ear 44, and, inasmuch as the pivots 49, 52 and 56 are in a straight line, the spring 45 cannot make the locking-arm 42 move in the direction of the arrow 47.

The downward movement of the handle 30 and plate 14 is halted when the finger 55 strikes the tab 54 which forces the trip-arm 59 to pivot until the lower end 63-a strikes the edge 63-b of the hole in the base-plate 40 caused by the formation of the tab 58.

The spring 25 then draws the plate 14 upwardly a short distance until the edge 57 of the arm 17 engages the ear 44 of the locking arm 42. The trays 12 will remain in this lower position until the outer end 54 or the pivot-pin 52 of the cocking-arm 51 is raised by some external force.

A manual control whereby the plate 14 may be released from its lower position is provided as follows:

To a tab 58 in the base 40, a trip-arm 59 is pivoted, as at 60. A generally horizontal portion 61 of the trip-arm 59 is disposed vertically beneath the outer end 54 of the cocking-arm 51 when the end 54 is moved to its lowermost position by the finger 55. The upper portion 63 of the trip-arm 59 is then adjacent a finger 62 on the operating arm 30.

When it is desired to release the plate 14 and the trays 12 from the lowered locked position, an upward movement at the outer end 37 of the arm 30 causes the arm 30 to pivot about the slot 32 until the abutment 38 strikes the ears 35 and the release finger 62 engages the vertical portion 63 of the trip-arm 59, bringing the horizontal portion 61 of the trip-arm 59 upwardly beneath the outer end 54 of the cocking-arm 51 and causing the cocking-arm 51 to swing upwardly about the pivot 56. Once the cocking-arm is raised upwardly, the central pivot-pin 52 is no longer in-line with the outer pivots 49 and 56 and the tension spring 45 can then pull the upper end of the locking arm 42 in the direction of the arrow 47. This releases the ear 44 from the edge 57 of the arm 17 and permits the spring 25 to raise the plate 14 and the trays 12.

The bread-carrying trays 12 and the plate 14 may be released automatically from the lower locked position by the hydraulic interval control 64. The hydraulic interval control 64 is an automatic timing mechanism which may be set into operation at the time of and by the lowering of the plate 14. Thus, the control time-cycle may be started when the bread is lowered into toasting position and, at the conclusion of the time-cycle, the hydraulic interval control will automatically release the heretofore-described locking mechanism and permit the plate 14 and the trays 12 to rise to the inoperative non-toasting position.

The hydraulic interval control, shown in detail in Figures 7 to 9 inclusive, includes a pair of spaced Sylphons or bellows 65 and 66 secured at their upper ends 67 and 68, respectively, in fluid-tight relationship to the connector 69. Both of the Sylphons 65 and 66 are sealed, at their lower ends 70 and 71, respectively, and provide expansible fluid-tight chambers which are interconnected, at their upper ends, through the conduit 72 in the connector 69.

An adjustable needle-type valve and filler-plug 73 are screw-threadedly secured in the conduit 72, and provide means for filling the Sylphons 65 and 66 and the conduit 72 with suitable control fluid (such as silicone, which has a very low vapor pressure and small viscosity change due to temperature change, and is fireproof).

A compression spring 74 within the bellows 66 urges the lower end 71 downwardly, at all times.

Within the Sylphon or bellows 65 a spring-operated check-valve 75 interconnects the interior of the bellows 65 and the conduit 72.

The conduit 72 includes a small by-pass port 76 which permits fluid to flow through the conduit 72, from one bellows to the other, irrespective of whether the valve 75 is open or closed.

A guide-pin 77 is secured to the lower end 70 of the bellows 65 and a guide-pin 78 is secured to the lower end 71 of the bellows 66. A rocker-arm 79 interconnects the pin 77 and the pin 78 and is pivotally supported at a fulcrum 80 by the hanger strap 81.

Thus, as one of the bellows expands, the other is forced to contract, proportionately, by the pivoting of the rocker-arm 79.

Also secured to the pin 77, as by the pivot-pin 83 beneath the rocker-arm 79, is a yoke 82.

The connector 69 is rigidly secured, as by the screws 84, to the top frame-member 23.

The lower end of the yoke 82 is pivotally secured, as at 85, to the lever 86. The lever 86 is pivotally fastened at one end to the vertical portion 46 of the base plate 40 by the pivot-pin 87. The other end 88 of the lever 86 extends vertically beneath the edge 57 of the arm 17.

A portion 89 of the yoke 82 provides a tunnel-like clearance space through which the cocking-arm 51 and the tension spring 45, heretofore described, may pass. One or more slots 90 are formed in the sides of the tunnel-like portion 89, and the ends of the pivot-pin 52 extend into these slots. The slots 90 are so positioned in respect to the pin 52 that the bottom edges 91 of the slots 90 may be brought vertically upwardly against the pin 52, at an appropriate time, whereby to lift the cocking arm 51 and disengage the locking mechanism heretofore described.

The automatic timing and releasing mechanism operates as follows:

When the plate 14, and particularly the arm 17 thereof, is lowered, at the beginning of a toasting cycle, the underside of the arm 17, and particularly the edge 57 thereof, is forced against the end 88 of the lever 86. The lever 86 pivots about the fulcrum 87, pulling the yoke 82 and hence the pin 77 downwardly.

Substantially simultaneously and independently of the pivoting of the lever 86, the locking mechanism heretofore described is operated and locks the plate 14 and the bread-carrying trays 12 in the lower position. The initial lower locked position of the plate 14 is shown particularly in Figure 5, wherein the lever 86 has been pivoted downwardly and the yoke 82 pulled downwardly to the initial starting position of the hydraulic interval control. In this position the lower edge 91 of the slots 90 are in spaced relation to the pivot-pin 52, as is shown particularly in Figure 5. Thus, the mechanism will remain in the lower locked position until the yoke 82 is lifted sufficiently to bring the edge 91 of the slot 90 against the pin 52 whereby to bring the pivot points 52 above a line between the pivot points 49 and 56 and permit the spring 45 to disengage the locking ear 44 from the lower arm 17. When this is accomplished, the plate 14 will be lifted vertically by the spring 25, as heretofore described.

The yoke 82 is raised vertically by the hydraulic interval control 64, as follows:

When the yoke 82 is pulled downwardly under the influence of the external action of the lever 86, the bellows 65 are extended and, conversely, the bellows 66 are contracted (by the rocker-arm 79) to the position shown in Figure 7. The hydraulic fluid within the bellows 66 is thus forced through the conduit 72, past the spring-loaded check-valve 75 into the bellows 65. Although a portion of the fluid will flow into the bellows 65 through the by-pass 76, most of the fluid rapidly will enter the bellows 65 through the check-valve 75. Thus, at the initial loaded position of the hydraulic interval control, the bellows 65 are extended a fixed amount and a predetermined quantity of hydraulic fluid is transferred from the bellows 66 to the bellows 65.

Figure 5:
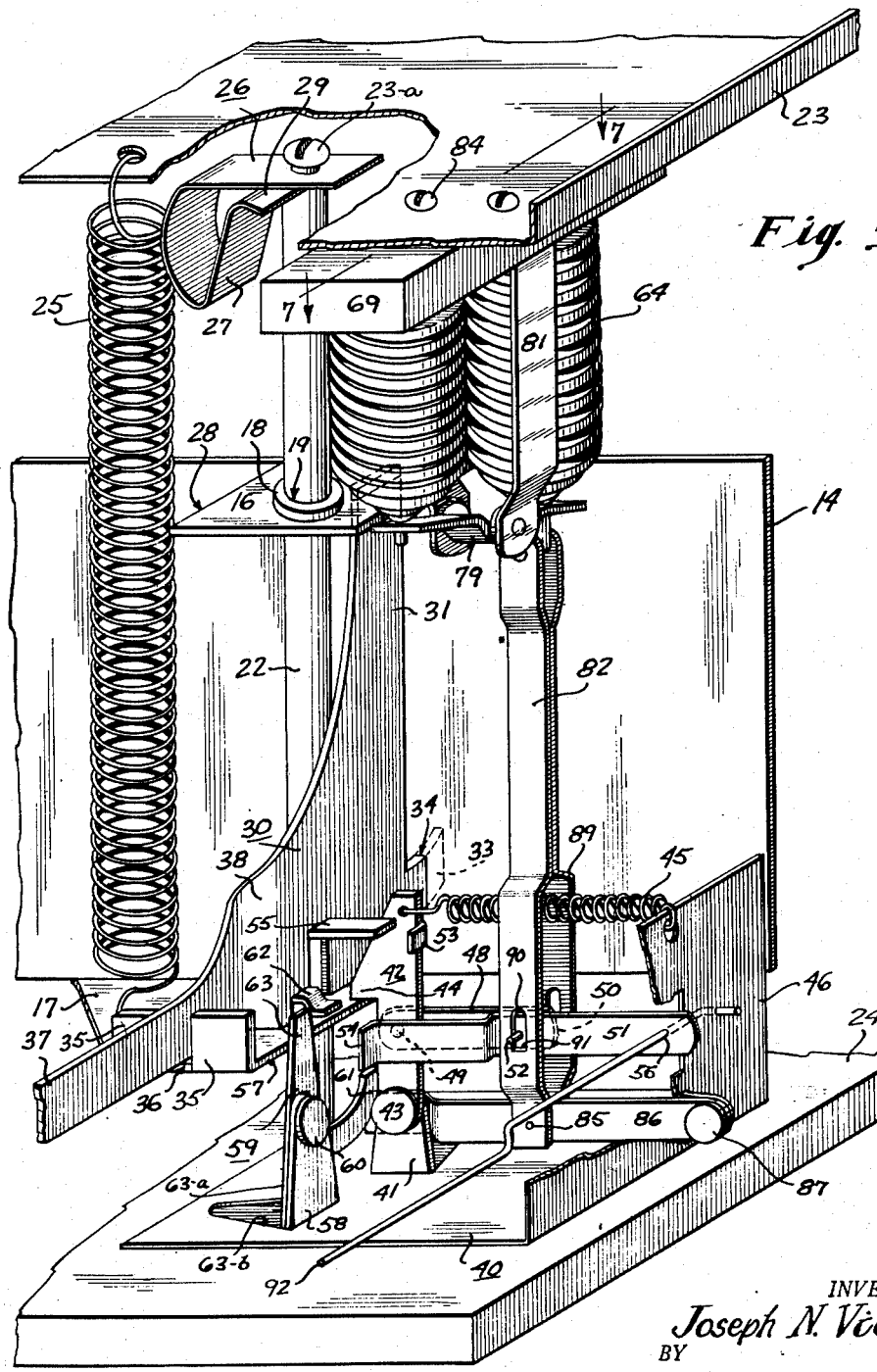
Figure 5 represents a perspective view of the control and timing mechanism at the start of the time-cycle.

After the initial downward movement, the arm 17 and the plate 14 rise slightly into engagement with the locking ear 44 (as shown in Figure 5) and out of contact with the end 88 of the lever 86, and the yoke 82 is free to rise vertically. Then the compression spring 74 expands the bellows 66 and (by means of the rocker-arm 79) shortens the bellows 65. Thus, the fluid within the bellows 65 is forced through the by-pass 76 and the conduit 72 into the bellows 66. Inasmuch as the check-valve 75 does not permit the flow of fluid therethrough outwardly from the bellows 65, the fluid from the bellows 65 must flow through the by-pass 76. The size of the by-pass 76 and the position of the needle-valve 73 prevents rapid transfer of the fluid from the bellows 65 to the bellows 66 and controls the rate-of-rise of the yoke 82. Thus, by adjusting the needle-valve 72, the rate-of-rise of the bottom edge 91 of the slots 90 may be controlled.

With an appropriate setting of the needle-valve 73, the time it takes the bottom edge 91 of the slot 90 to contact the pivot-pin 52 may be the proper interval within which to toast a piece of bread.

Therefore, when the edge 91 strikes the pivot-pin 52 and disengages the latch 42 from the arm 17, the bread will be toasted, and, when the plate rises and lifts the bread-carrying trays 12 upwardly, properly toasted bread will be exposed in the slots 13.

Slight adjustments may be made to control the degree of toasting (i. e., light or dark toast) by the pivot member 56. This lever 56 is supported in the plate 46, and a vertical manipulation of the outer end 92 (exteriorly of the toaster housing) changes the vertical position of the fulcrum 56 where the cocking-arm 51 is supported. Before the locking mechanism is moved to the position shown in Figure 5, the vertical position of the pivot-pin 52 may be shifted slightly by moving the fulcrum 56. Thus, the space between the pivot-pin 52 and the lower edge 91 of the slot 90 may be varied slightly, increasing or decreasing the amount of time it takes for the edge 91 to contact the pivot-pin 52 and disengage the latch 42.

The rate-of-rise of the yoke 82 may be initially controlled by proper adjustment of the needle-valve 73 (this adjustment preferably being made at the factory) and, thereafter, slight adjustments in the toasting interval may be made by manipulating the fulcrum 56 to shorten or lengthen the toasting cycle.

It is not necessary to wait for the hydraulic interval control to release the locking mechanism, but the locking mechanism may be disengaged from the arm 17 by lifting the handle 30 vertically, to effect a manual disengagement of the plate 14, and, thus, the bread-carrying trays may be released prior to the end of the automatic toasting cycle.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, what I claim as new and desire to protect by Letters Patent is the following:

1. In a locking mechanism, a locking arm having a pivotal support at one end and having a locking-ear at the other end, a link, a cocking arm having a pivotal support at one end, said link secured at one end to said locking arm between the pivotal support and the locking ear thereof and connected at its other end to said cocking arm, a spring at all times urging said locking arm into non-locking position, said locking arm being moved to locking position by aligning the points of connection between said link and said cocking and locking arms with the pivotal support of said cocking arm.

2. In a locking mechanism, a locking arm having a pivotal support at one end and having a locking-ear at the other end, a link, a cocking arm having a pivotal support at one end, said link secured at one end to said locking arm between the pivotal support and the locking ear thereof and connected at its other end to said cocking arm between the pivotal support of said locking arm and the pivotal support of said cocking arm, a spring at all times urging said locking arm into non-locking position, said locking arm being moved to locking position by aligning the points of connection between said link and said cocking and locking arms with the pivotal support of said cocking arm.

3. In a locking mechanism, a locking arm having a pivotal support at one and having a locking-ear at the other end, a link, a cocking arm having a pivotal support at one end, said link secured at one end to said locking arm between the pivotal support and the locking ear thereof and connected at its other end to said cocking arm, a spring at all times urging said locking arm into non-locking position, said locking arm being moved to locking position by aligning the points of connection between said link and said cocking and locking arms with the pivotal support of said cocking arm, said locking arm moved to non-locking position by said spring when the point of connection between said link and said cocking arm is moved out of alignment with the pivotal support for said cocking arm and the point of connection between said link and said locking arm.

4. In a locking mechanism, a locking arm having a pivotal support at one end and having a locking-ear at the other end, a link, a cocking arm having a pivotal support at one end, said link secured at one end to said locking arm between the pivotal support and the locking ear thereof and connected at its other end to said cocking arm, a spring at all times urging said locking arm into non-locking position, said locking arm being moved to locking position by aligning the points of connection between said link and said cocking and locking arms with the pivotal support of said cocking arm, and independent manual control for releasing said locking arm.

5. In a locking mechanism, a locking arm having a pivotal support at one end and having a locking-ear at the other end, a link, a cocking arm having a pivotal support at one end, said link secured at one end to said locking arm between the pivotal support and the locking ear thereof and connected at its other end to said cocking arm, a spring at all times urging said locking arm into non-locking position, said locking arm being moved to locking position by aligning the points of connection between said link and said cocking and locking arms with the pivotal support of said cocking arm, and automatic interval control mechanism independently actuated to release said locking arm.

6. In a locking mechanism, a locking arm having a pivotal support at one end and having a locking-ear at the other end, a link, a cocking arm having a pivotal support at one end, said link secured at one end to said locking arm between the pivotal support and the locking ear thereof and connected at its other end to said cocking arm, a spring at all times urging said locking arm into non-locking position, said locking arm being moved to locking position by aligning the points of connection between said link and said cocking and locking arms with the pivotal support of said cocking arm, and automatic interval control mechanism independently actuated to release said locking arm, said interval control mechanism including a pair of bellows interconnected by a fluid-conduit at one end and by a rocker-arm at the other end, said bellows and said conduit filled with non-compressible fluid, a compression spring within one bellows, a fluid check-valve for controlling fluid-flow in said conduit, a variable-area by-pass around said check-valve, said rocker-arm adapted to compress one of said bellows and said compression spring therein as the other of said bellows is extended causing fluid to flow from the compressed bellows through said check-valve into said extended bellows, said compression spring adapted to extend said compression bellows and through said rocker-arm to compress said extended bellows forcing fluid from said extended bellows through the variable-area by-pass into said compressed bellows.

JOSEPH N. VICTOR.

References Cited in the file of this patent
UNITED STATES PATENTS

| Number | Name | Date |
|---|---|---|
| 1,184,498 | Wells | May 23, 1916 |
| 1,242,750 | Wells | Oct. 9, 1917 |
| 1,875,616 | Kohout | Sept. 6, 1932 |
| 2,325,225 | Burke | July 27, 1943 |
| 2,343,347 | Turner | Mar. 7, 1944 |
| 2,377,461 | Swift | June 5, 1945 |